US012650920B2

(12) United States Patent
Chen et al.

(10) Patent No.: US 12,650,920 B2
(45) Date of Patent: Jun. 9, 2026

(54) METHOD AND APPARATUS FOR GENERATING CHUNK GROUP AND DEVICE

(71) Applicant: Huawei Technologies Co., Ltd., Shenzhen (CN)

(72) Inventors: Piao Chen, Chengdu (CN); Feng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/758,537

(22) Filed: Jun. 28, 2024

(65) Prior Publication Data

US 2024/0354246 A1     Oct. 24, 2024

Related U.S. Application Data

(63) Continuation of application No. PCT/CN2022/142246, filed on Dec. 27, 2022.

(30) Foreign Application Priority Data

Dec. 29, 2021     (CN) ......................... 202111643049.5
Dec. 31, 2021     (CN) ......................... 202111666642.1

(51) Int. Cl.
*G06F 12/02*          (2006.01)
(52) U.S. Cl.
CPC ................................ *G06F 12/0246* (2013.01)
(58) Field of Classification Search
None
See application file for complete search history.

(56) References Cited

U.S. PATENT DOCUMENTS

| | | | | |
|---|---|---|---|---|
| 7,610,437 B2* | 10/2009 | Sinclair | ................ | G06F 3/0652 |
| | | | | 711/104 |
| 7,984,084 B2* | 7/2011 | Sinclair | ............... | G06F 16/1847 |
| | | | | 707/818 |
| 8,285,918 B2* | 10/2012 | Maheshwari | ........ | G11C 7/1072 |
| | | | | 711/159 |
| 8,443,263 B2* | 5/2013 | Selinger | ............. | G06F 11/1068 |
| | | | | 714/768 |
| 8,873,284 B2* | 10/2014 | Sinclair | ............... | G06F 12/0246 |
| | | | | 365/185.11 |
| 9,223,693 B2* | 12/2015 | Sinclair | ............... | G06F 12/0246 |
| 9,336,133 B2* | 5/2016 | Sinclair | ............... | G06F 12/0246 |
| 9,348,746 B2* | 5/2016 | Sinclair | ............... | G06F 12/0246 |
| 9,465,731 B2* | 10/2016 | Sinclair | ............... | G06F 12/0246 |
| 9,652,382 B1* | 5/2017 | Subramanian | ...... | G06F 12/0253 |
| 9,734,050 B2* | 8/2017 | Sinclair | ............... | G06F 12/0253 |
| 9,734,911 B2* | 8/2017 | Sinclair | ............... | G06F 3/0658 |
| 9,778,855 B2* | 10/2017 | Sinclair | .................. | G06F 3/064 |

(Continued)

FOREIGN PATENT DOCUMENTS

| | | |
|---|---|---|
| CN | 105630423 A | 6/2016 |
| CN | 107436733 A | 12/2017 |

*Primary Examiner* — Christopher D Birkhimer
(74) *Attorney, Agent, or Firm* — Conley Rose, P.C.

(57)          ABSTRACT

After capacity expansion of a storage system, a large-width target chunk group is generated by using a plurality of original small-width source chunk groups in the storage system. In a stripe of the target chunk group, a check stripe unit part points to a check shard, and a data stripe unit part does not directly point to a data shard, but points to a data stripe unit of a source stripe.

20 Claims, 9 Drawing Sheets

(56)                    References Cited

U.S. PATENT DOCUMENTS

| | | | | |
|---|---|---|---|---|
| 9,892,803 | B2 * | 2/2018 | Reed | G06F 12/0811 |
| 10,108,543 | B1 * | 10/2018 | Duggal | G06F 11/14 |
| 10,108,544 | B1 * | 10/2018 | Duggal | G06F 11/14 |
| 10,120,613 | B2 * | 11/2018 | Sinclair | G06F 12/02 |
| 10,133,490 | B2 * | 11/2018 | Sinclair | G06F 3/0655 |
| 10,255,179 | B2 * | 4/2019 | Ji | G06F 3/0659 |
| 10,365,983 | B1 * | 7/2019 | Foley | G06F 11/2094 |
| 10,430,279 | B1 * | 10/2019 | Dittia | G06F 3/0656 |
| 10,739,996 | B1 * | 8/2020 | Ebsen | G06F 16/1727 |
| 10,795,812 | B1 * | 10/2020 | Duggal | G06F 3/067 |
| 10,891,228 | B2 * | 1/2021 | Steinmacher-Burow | G06F 12/0817 |
| 10,983,715 | B2 * | 4/2021 | Sharoni | G06F 21/79 |
| 11,086,537 | B2 * | 8/2021 | Byun | G06F 12/0253 |
| 2007/0033325 | A1 * | 2/2007 | Sinclair | G06F 3/0608 711/170 |
| 2008/0082596 | A1 * | 4/2008 | Gorobets | G06F 12/0253 |
| 2008/0189477 | A1 * | 8/2008 | Asano | G06F 12/0246 711/E12.008 |
| 2011/0145473 | A1 * | 6/2011 | Maheshwari | G11C 7/1072 711/E12.008 |
| 2011/0161784 | A1 * | 6/2011 | Selinger | G06F 11/1016 714/E11.002 |
| 2011/0302358 | A1 * | 12/2011 | Yu | G06F 11/108 711/E12.008 |
| 2014/0325148 | A1 * | 10/2014 | Choi | G06F 3/0659 711/114 |
| 2014/0365719 | A1 * | 12/2014 | Kuzmin | G06F 12/0246 711/103 |
| 2015/0227602 | A1 * | 8/2015 | Ramu | G06F 11/1456 707/634 |
| 2016/0196216 | A1 * | 7/2016 | Lee | G06F 3/0631 711/170 |
| 2016/0246713 | A1 * | 8/2016 | Choi | G06F 3/0608 |
| 2017/0123655 | A1 * | 5/2017 | Sinclair | G06F 3/061 |
| 2017/0242790 | A1 * | 8/2017 | O'Krafka | G06F 3/0652 |
| 2017/0300422 | A1 * | 10/2017 | Szubbocsev | G06F 12/1009 |
| 2018/0189175 | A1 * | 7/2018 | Ji | G06F 3/0679 |
| 2019/0317859 | A1 | 10/2019 | Danilov et al. | |
| 2020/0004447 | A1 | 1/2020 | Danilov et al. | |
| 2020/0089420 | A1 * | 3/2020 | Sharoni | G06F 21/79 |
| 2020/0192794 | A1 * | 6/2020 | Lee | G06F 3/0653 |
| 2020/0218653 | A1 * | 7/2020 | Ryu | G06F 12/0253 |
| 2020/0310686 | A1 * | 10/2020 | Truong | G06F 3/061 |
| 2021/0342362 | A1 * | 11/2021 | Haravu | G06F 11/1464 |
| 2021/0389904 | A1 * | 12/2021 | Lee | G06F 3/0679 |
| 2021/0406216 | A1 * | 12/2021 | Komatsu | G06F 16/11 |
| 2024/0202114 | A1 * | 6/2024 | Tang | G06F 12/0246 |

* cited by examiner

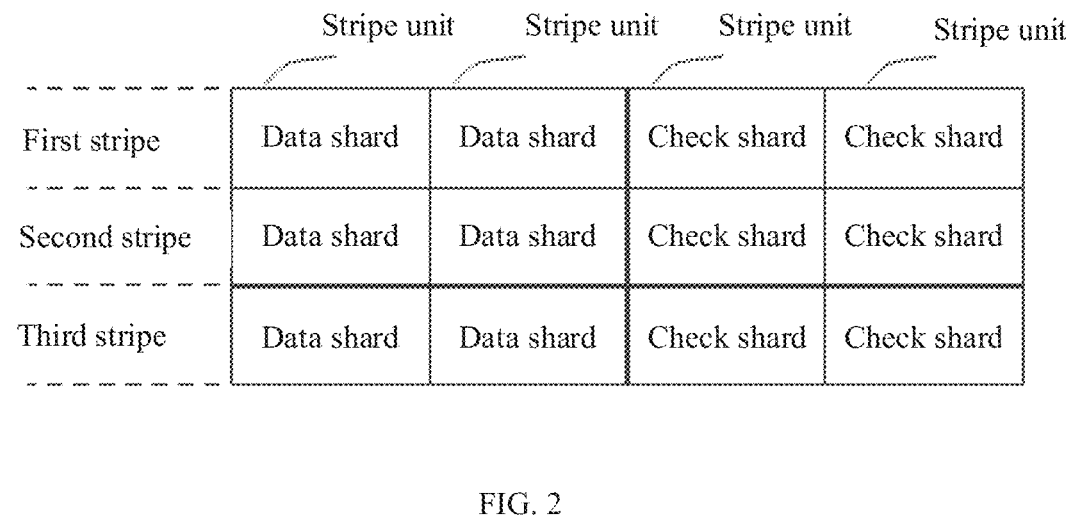

| | Stripe unit | Stripe unit | Stripe unit | Stripe unit |
|---|---|---|---|---|
| First stripe | Data shard | Data shard | Check shard | Check shard |
| Second stripe | Data shard | Data shard | Check shard | Check shard |
| Third stripe | Data shard | Data shard | Check shard | Check shard |

FIG. 2

| Target column | Source column |
|---|---|
| [Chunk group C: first column] | [Chunk group A: first column] |
| [Chunk group C: second column] | [Chunk group A: second column] |
| [Chunk group C: third column] | [Chunk group B: first column] |
| [Chunk group C: fourth column] | [Chunk group B: second column] |

METHOD AND APPARATUS FOR GENERATING CHUNK GROUP AND DEVICE

CROSS-REFERENCE TO RELATED APPLICATIONS

This is a continuation of Int'l Patent App. No. PCT/CN2022/142246, filed on Dec. 27, 2022, which claims priority to Chinese Patent App. No. 202111666642.1, filed on Dec. 31, 2021 and Chinese Patent App. No. 202111643049.5, filed on Dec. 29, 2021, all of which are incorporated by reference.

FIELD

The present disclosure relates to the field of storage technologies, and in particular, to a method and an apparatus for generating a chunk group and a device.

BACKGROUND

A widely used storage manner is to store data, in a chunk group manner, in a storage system including a plurality of storage devices. A chunk group includes a plurality of shards that have a relationship established by using an erasure code (EC). In the EC technology, original data is split into n data shards, m check shards are generated by using the n data shards, and an association relationship is established in a form of a stripe. The n+m data shards in the stripe form a data check group. Different data shards in the stripe are stored on different storage devices. When less than m data shards are lost, the lost data shards may be recovered by using a non-lost shard.

As enterprises continuously generate new data, storage space that can be provided by the existing storage devices in the storage system may become insufficient. Therefore, repeated capacity expansion of the storage system is a common task for the enterprises. After the capacity expansion, the storage system can usually use a higher redundancy ratio to improve storage space utilization of the storage devices. However, data stored before the capacity expansion is still in a low redundancy ratio.

To improve the storage space utilization of the entire storage system, one approach is reading data shards in a chunk group with a low redundancy ratio from the storage device, and writing the data shards as new data into the storage device in a manner of a high redundancy ratio, to form a new chunk group. However, in this practice, a large quantity of data shards need to be read, and the read data shards further need to be written into the storage device again. This imposes a burden on performance of the storage system.

SUMMARY

According to a first aspect, a method for generating a chunk group is provided, including: obtaining a first source stripe from a first source chunk group, where the first source stripe includes a first data stripe unit group having a first data shard group and a first check stripe unit group having a first check shard group; obtaining a second source stripe from a second source chunk group, where the second source stripe includes a second data stripe unit group having a second data shard group and a second check stripe unit group having a second check shard group; generating a target stripe, where the target stripe includes a target data stripe unit group and a target check stripe unit group, the target data stripe unit group points to the first data stripe unit group and the second data stripe unit group, the target check stripe unit group has a target check shard group, and there is a check relationship between the target check shard group and a set including the first data shard group and the second data shard group; and storing the target check shard group in a storage device group.

A stripe unit group is a set of stripe units. All data stripe units in a same stripe form a data stripe unit group of the stripe, and all check stripe units in the same stripe form a check stripe unit group of the stripe. Therefore, the data stripe unit group+the check stripe unit group=the stripe.

In a plurality of shards that have a check relationship, when a small quantity of shards are lost, the lost shards may be recovered by using a check algorithm and a remaining stripe. Therefore, that there is a check relationship between the target check shard group and the set including the first data shard group and the second data shard group means that in a shard set including the target check shard group, the first data shard group, and the second data shard group, when a small quantity of shards are lost, no true data loss is caused, and the lost shards may be recovered through data reconstruction by using other shards in the set. A quantity of shards that can be reconstructed is determined by the check algorithm. In a check relationship set including n data shards and m check shards, a maximum of m chunks can be recovered at a time.

In this solution, a new chunk group is generated by using the first chunk group and the second chunk group, which is equivalent to implementing chunk group combination. In addition, the first data shard group and the second data shard group may be protected without depending on check shards of the first source chunk group and the second source chunk group. Therefore, storage space can be reduced.

This solution is applicable to a scenario in which capacity of a storage system is expanded. After a storage device group is added to the storage system, utilization of the storage device group is improved after the capacity is expanded according to this solution.

In a first possible implementation of the first aspect, both the first source chunk group and the second source chunk group are located in the storage device group before capacity expansion of the storage system, and the step of storing the target check shard group specifically includes: storing a check shard of the target stripe in a storage device group that is newly added after the capacity expansion of the storage device group.

When all data shards are in an old storage device group, the check shard of the target stripe is stored in the storage device group that is newly added after the capacity expansion of the storage device group, so that a possibility that the check shard and the data shard are located in a same storage device group can be avoided, to further reduce a probability of data loss.

In a second possible implementation of the first aspect, the first source chunk group is located in the storage device group before capacity expansion of the storage system, the second source chunk group is a chunk group that is not stored in the storage device group, and the step of storing the target check shard group specifically includes: storing a check shard of the target stripe in a storage device group that is newly added after the capacity expansion of the storage system.

When a part of data shards are in an old storage device group, and another part of the data shards (generated based on newly-written data or generated based on data obtained through garbage collection) have not been written to a disk, the check shard of the target stripe is stored in the storage device group that is newly added after the capacity expansion of the storage device group, so that a possibility that the check shard and the data shard are located in a same storage device group can be avoided, to further reduce a probability of data loss.

In a third possible implementation of the first aspect, a read request for a target stripe unit in the target stripe is received; a stripe unit corresponding to the target stripe unit is determined based on a data stripe unit group to which the target data stripe unit points, where the determined stripe unit belongs to the first data stripe unit group or the second data stripe unit group; and a data shard of the determined stripe unit is obtained.

This solution provides a process of directly reading the data shard.

In a fourth possible implementation of the first aspect, when a data shard in the first data shard group or the second data shard group is lost, the target check shard group is read, a non-lost data shard in the first source stripe and the second source stripe is read, and the lost data shard is reconstructed.

This solution provides a process of reconstructing a lost data shard when the data shard is lost and cannot be directly read.

The first aspect describes a process of combining two source stripes to generate a new stripe. In a fifth possible implementation of the first aspect, a new chunk group may be further generated based on the target stripe generated in the first aspect and a stripe of another chunk group. To distinguish from the original target stripe, a stripe generated through re-combination is referred to as a new target stripe. A stripe in which the target stripe is located is named as a target chunk group. The method further includes: obtaining a third source stripe from a third source chunk group, where the third source stripe includes a third data stripe unit group having a third data shard group and a third check stripe unit group having a third check shard group; generating a new target stripe based on the target stripe and the third source stripe, where the new target stripe includes a new target data stripe unit group and a new target check stripe unit group, and the new target data stripe unit group points to the first data stripe unit group, the second data stripe unit group, and the third data stripe unit group, or the new target data stripe unit group points to the target data stripe unit group and the third data stripe unit group, the new target check stripe unit group has a new target check shard group, and there is a check relationship between the new target check shard group and a data set including a data shard group to which the new target data stripe unit group points; and storing the new target check shard group in the storage device group. The "pointing" herein may be direct pointing, or may be indirect pointing (a stripe unit group A directly points to a stripe unit group B, and the stripe unit group B directly points to a stripe unit group C, so that the stripe unit group A and the stripe unit group C are in an indirect pointing relationship).

According to a second aspect, a management apparatus for generating a chunk group is provided. The management apparatus includes: an obtaining module configured to obtain a first source stripe from a first source chunk group, where the first source stripe includes a first data stripe unit group having a first data shard group and a first check stripe unit group having a first check shard group, where the obtaining module is further configured to obtain a second source stripe from a second source chunk group, where the second source stripe includes a second data stripe unit group having a second data shard group and a second check stripe unit group having a second check shard group; a generation module configured to generate a target stripe, where the target stripe includes a target data stripe unit group and a target check stripe unit group, the target data stripe unit group points to the first data stripe unit group and the second data stripe unit group, the target check stripe unit group has a target check shard group, and there is a check relationship between the target check shard group and a set including the first data shard group and the second data shard group; and a storage module configured to store the target check shard group in a storage device group.

According to a third aspect, a storage management device is provided, including: a storage medium configured to store program instructions; and at least one processor, coupled to the storage medium. The at least one processor is configured to perform the first aspect and the possible implementations of the first aspect by running the computer program.

According to a fourth aspect, a computer program product including instructions is provided. When the computer program product runs on a computer, the computer is enabled to perform the solution in the first aspect and the solutions in the possible implementations of the first aspect.

According to a fifth aspect, a computer-readable storage medium is provided, including instructions. When the instructions are run on a computer, the computer is enabled to perform the solution in the first aspect and the solutions in the possible implementations of the first aspect.

The second aspect to the fifth aspect have beneficial effects of the first aspect and the implementations of the first aspect.

According to a sixth aspect, a method for generating a chunk group is provided. The method includes: obtaining N source stripes from N source chunk groups, where different source stripes come from different source chunk groups, each source stripe includes a data stripe unit group having a data shard group and a check stripe unit group having a check shard group, and N is equal to 2 or N is greater than 2; generating a target stripe, where the target stripe includes a target data stripe unit group and a target check stripe unit group, the target data stripe unit group points to all the source stripe unit groups, the target check stripe unit group has a target check shard group, and there is a check relationship between the target check shard group and a set of all the source stripe unit groups; and storing the target check shard group in a storage device group.

In this solution, a new stripe may be generated based on more than two chunk groups at a time. Therefore, a processing capability is stronger than that in the first aspect.

According to a seventh aspect, a management apparatus for generating a chunk group is provided. The management apparatus includes: an obtaining module configured to obtain N source stripes from N source chunk groups, where different source stripes come from different source chunk groups, each source stripe includes a data stripe unit group having a data shard group and a check stripe unit group having a check shard group, and N is greater than 2; a generation module configured to generate a target stripe, where the target stripe includes a target data stripe unit group and a target check stripe unit group, the target data stripe unit group points to the N source stripe unit groups, the target check stripe unit group has a target check shard group, and there is a check relationship between the target check shard group and a set of N data shard groups; and a storage module configured to store the target check shard group in a storage device group.

According to an eighth aspect, a management apparatus for generating a chunk group is provided. The apparatus includes a storage medium configured to store program instructions; and further includes at least one processor coupled to the storage medium. The at least one processor is configured to perform the following steps by running the computer program: obtaining N source stripes from N source chunk groups, where different source stripes come from different source chunk groups, each source stripe includes a data stripe unit group having a data shard group and a check stripe unit group having a check shard group, and N is greater than 2; generating a target stripe, where the target stripe includes a target data stripe unit group and a target check stripe unit group, the target data stripe unit group points to all the source stripe unit groups, the target check stripe unit group has a target check shard group, and there is a check relationship between the target check shard group and a set of all the source stripe unit groups; and storing the target check shard group in a storage device group.

According to a ninth aspect, a computer program product including instructions is provided. When the computer program product runs on a computer, the computer is enabled to perform the solution in the first aspect and the solutions in the possible implementations of the first aspect.

According to a tenth aspect, a computer-readable storage medium is provided, including instructions. When the instructions are run on a computer, the computer is enabled to perform the solution in the first aspect and the solutions in the possible implementations of the first aspect.

The seventh aspect to the tenth aspect have beneficial effects of the sixth aspect and the implementations of the sixth aspect.

BRIEF DESCRIPTION OF THE DRAWINGS

FIG. 2 is a diagram of a chunk group;

FIG. 8 is a diagram of a correspondence between columns of a chunk group;

DETAILED DESCRIPTION

Embodiments may be applied to an append only centralized storage system or an append only distributed storage system. Append only data can be deleted but cannot be upgraded through overwriting. Embodiments are also applicable to a non-append-only storage system.

In the centralized or distributed storage system, storage devices or hard disks provide storage space in a form of a chunk. Chunks from a plurality of storage devices form a chunk group. Each chunk group includes one or more stripes, there is an EC check relationship between chunks in a same stripe, and chunks in a same chunk group are distributed in a same storage device. In distributed storage, a logical chunk group may also be considered as a log of an append only type, for example, a p log.

Figure 1:
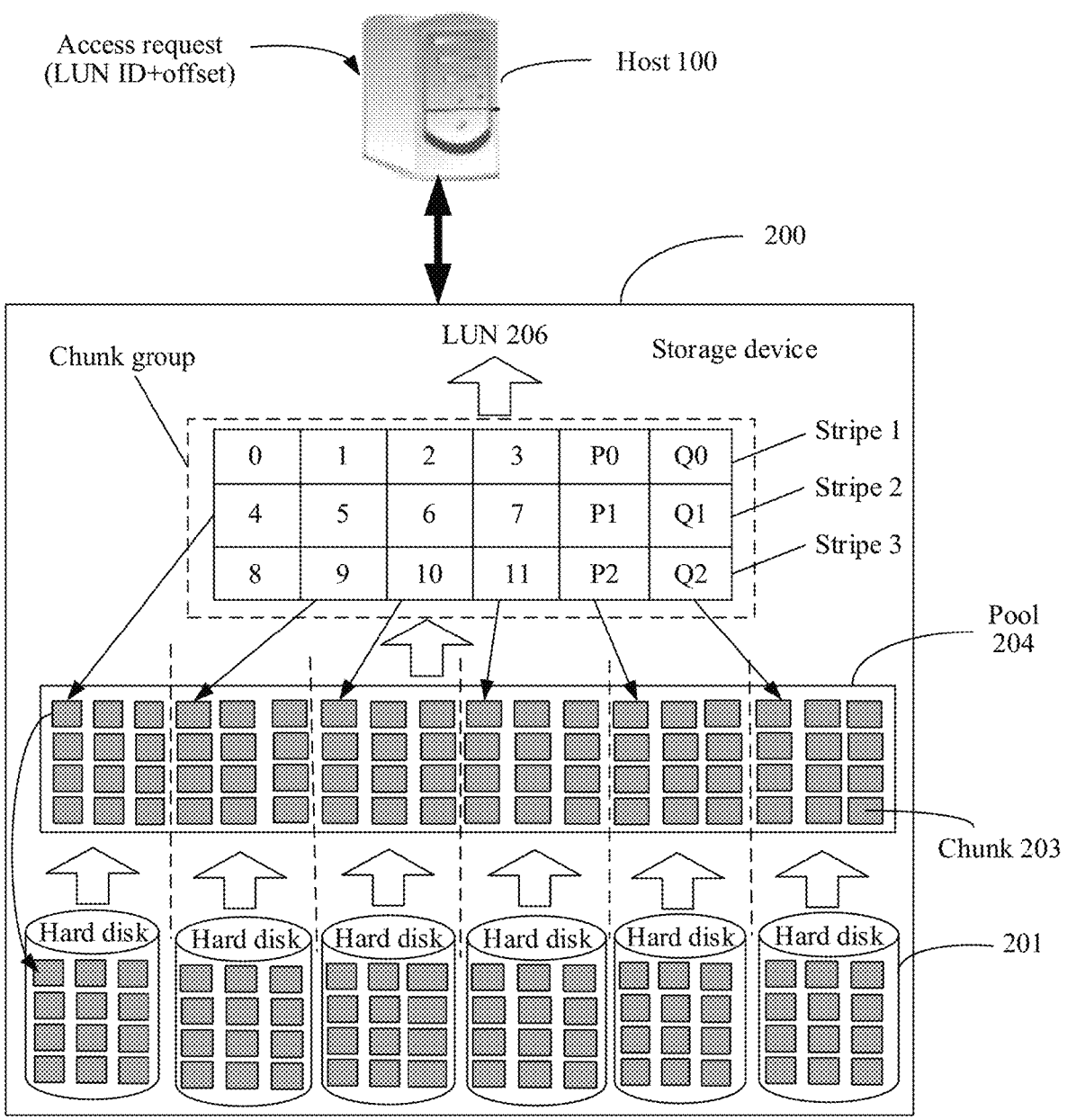
FIG. 1 is a diagram of a centralized storage system.

FIG. 1 shows a centralized storage system formed by a single storage device. In another embodiment, a distributed storage system may alternatively be formed by a plurality of storage devices (each storage device includes a plurality of hard disks). The storage system in FIG. 1 includes a controller (not shown in the figure) and several hard disks 201. The controller provides a function of managing a stripe, a chunk, and a chunk group, and performs conversion between addresses at different layers. The hard disk 201 provides physical storage space. An actual address of the storage space provided by the hard disk 201 is not directly exposed to an application host 100 (host 100 for short). The hard disk 201 may be of any type. This embodiment is described by using a solid state disk as an example, but is also applicable to a mechanical hard disk or another type of hard disk.

The storage space of the hard disk 201 is formed by the controller into a storage pool 204 by using logical chunks. The storage pool 204 is configured to provide storage space for an upper-layer service, and the storage space actually comes from the hard disk 201 included in the system. A plurality of logical chunks from different hard disks 201 form one chunk group, and the chunk group is a minimum allocation unit of the storage pool 204. When a storage service layer applies for storage space from the storage pool 204, the storage pool 204 may provide one or more chunk groups for the storage service layer. The storage service layer further virtualizes the storage space provided by the chunk groups into a logical unit (LU) 206, and provides the logical unit for the host 100 to use. Each logical unit has a unique logical unit number (LUN). Because the host 100 can directly sense the logical unit number of the logical unit, a person skilled in the art usually directly uses the LUN to represent the logical unit. Each LUN has a LUN identifier (ID), which is used to identify the LUN. A specific location of data in the LUN may be determined by a start address and a length of the data. The start address is usually referred to as a logical block address (LBA) by a person skilled in the art. It may be understood that three factors, namely, a LUN ID, an LBA, and a length, identify one determined address segment. A data access request generated by the host 100 usually carries the LUN ID, the LBA, and the length.

In FIG. 1, a first column of a chunk group corresponds to one chunk. For example, data shards 0, 4, and 8 are stored in one chunk, data shards 1, 5, and 9 are stored in another chunk, and the two chunks are located in different hard disks.

A quantity of chunks included in one chunk group depends on a mechanism (also referred to as a redundancy mode) used to ensure data reliability. Generally, to ensure data reliability, a storage system may store data by using an erasure coding (EC) check mechanism. The EC check mechanism is a RAID technology, and means that to-be-stored data is split into at least two data shards, and check shards of the at least two data shards are calculated according to a check algorithm. When one data shard is lost, data may be recovered by using another data shard and the check shards. If the EC check mechanism is used, one chunk group includes at least three chunks, and the chunks are located on different hard disks 201.

The foregoing describes the centralized scenario, and the present disclosure is also applicable to a distributed scenario. When the hard disks 201 in FIG. 1 are distributed in a plurality of storage devices (for example, storage servers) or sites, a set of the plurality of storage devices becomes a distributed storage system. In the distributed storage system, different stripe units of a same stripe are located in different storage devices; or in different stripe units of a same stripe, some stripe units are located in different hard disks of a same storage device, but not all stripe units are centralized in a same storage device. In the distributed storage system, each storage device may provide storage space in a pool manner, as shown in FIG. 1; or may not provide storage space in a pool manner.

Different chunk groups are distinguished by using different chunk group IDs. One chunk group may have only one stripe, or may have a plurality of stripes. FIG. 2 shows one chunk group, and each row in the chunk group represents one stripe. Therefore, the chunk group in FIG. 2 includes three stripes: stripe A, stripe B, and stripe C. Each stripe includes a plurality of stripe units, and each stripe unit corresponds to one shard. Data shards and check shards of a same stripe unit form one check group, and there is a check relationship between shards in the check group.

In the EC technology, data (for example, a file) is split to obtain n data shards, and m check shards (redundant shards) are obtained by performing calculation on the data shards by using an EC algorithm. Different stripes in a same chunk group have same n and m. The n+m shards form one check group, and storage space utilization of the check group is $n/(n+m)$. Correspondingly, storage space utilization of a stripe and a chunk group in which the check group is located is also $n/(n+m)$. For n+m shards in a same check group, when any shard (a data shard or a redundant shard) is faulty, the faulty shard can be recovered by using a corresponding reconstruction algorithm. A process of generating a check shard is referred to as encoding, and a process of recovering a lost shard is referred to as decoding.

Generally, different shards of a same stripe are stored in different storage devices. In this way, when data is lost because some storage devices are faulty, a lost shard may be recovered by using a shard in a storage device that is not faulty. The storage device herein is, for example, a hard disk, a storage server, or a storage site. Shards in a same check group form an association relationship in a form of a stripe. Each check group corresponds to one stripe, and each shard corresponds to one stripe unit in the stripe.

In a process of using a storage device to store data, a quantity of storage devices of the storage system may increase. For example, when existing space of the storage system is insufficient, a new storage device is added to the storage system, increasing the quantity of storage devices; or when a device in the storage system is faulty, and only a non-faulty storage device is available (the quantity of storage devices decreases), a new storage device replaces the faulty storage device, (increasing the quantity of storage devices). With the increase of storage devices, the storage system can support a wider stripe. A stripe width may be used to describe a width of a stripe. A larger stripe width brings higher storage space utilization.

Figure 3:
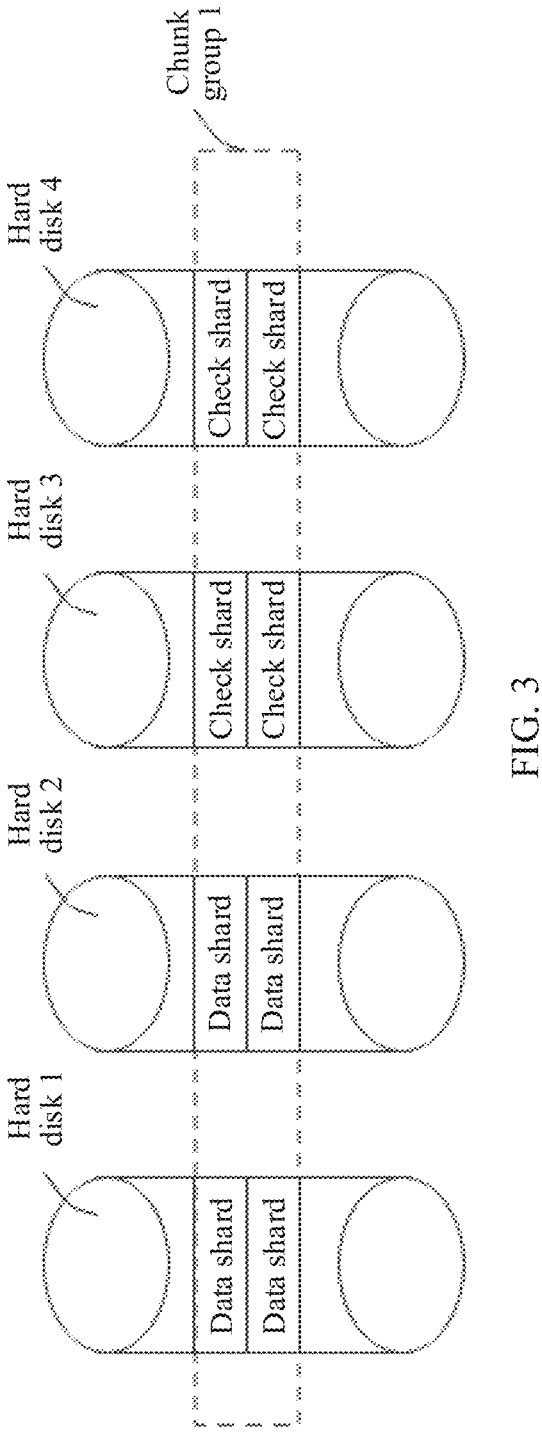
FIG. 3 is a diagram of storing a chunk group in a hard disk group.
Figure 4:
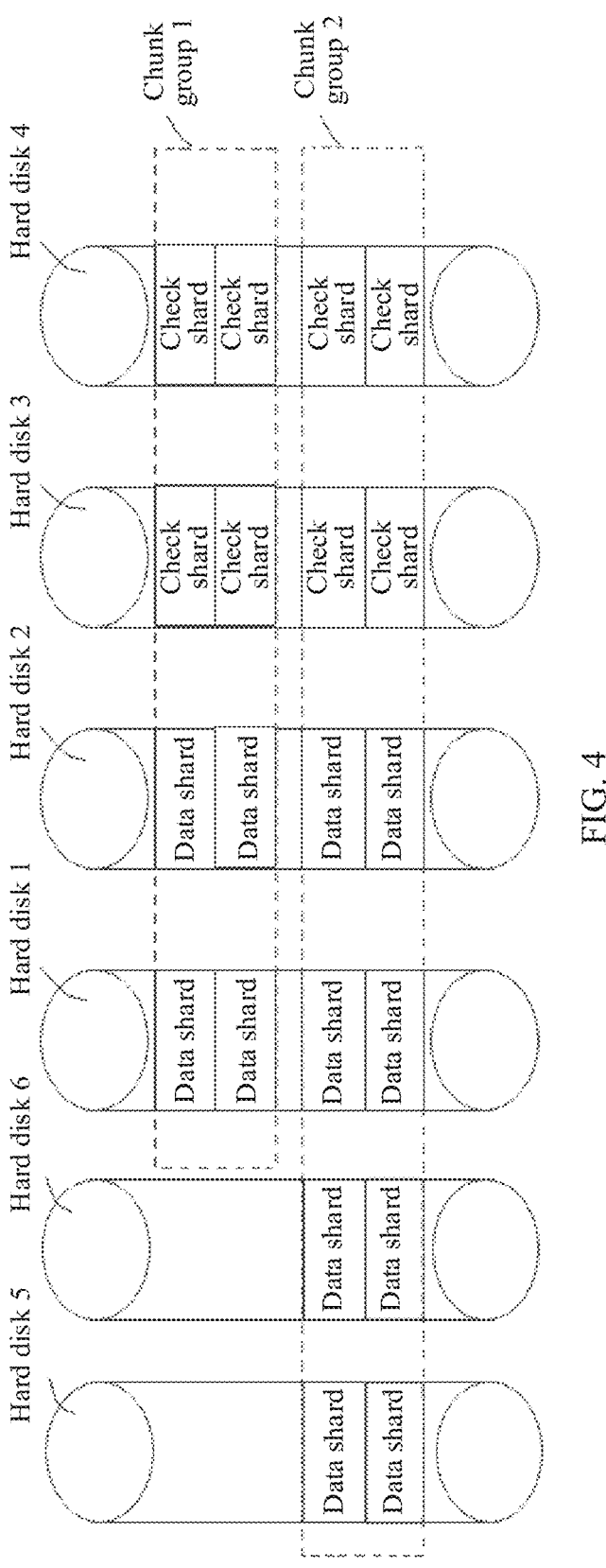
FIG. 4 is a diagram of storing a chunk group in a hard disk group after capacity expansion of a hard disk.

An example in which the storage device is a hard disk is used. Refer to FIG. 3. In a hard disk group including four hard disks, a chunk group 1 (including two stripes) spans all hard disks. Therefore, a width of a stripe A1 is 4. In the chunk group 1, a ratio of a quantity of check shards to a quantity of data shards is 1:1, and storage space utilization is 50%. Refer to FIG. 4. If a hard disk 5 and a hard disk 6 are newly added to the hard disk group, new data may be written into the hard disks in a manner of a chunk group 2 (including two stripes). Widths of both stripes in the chunk group 2 are 6, and it may be considered that a chunk group width of the chunk group 2 is 6. In the chunk group 2, a ratio (also referred to as a redundancy ratio) of a quantity of check shards to a quantity of data shards is 1:2. The redundancy ratio is lower than the ratio in the chunk group 1. Therefore, storage space utilization is 66.7%. It can be learned that the storage space utilization of the chunk group 2 is higher than that of the chunk group 1.

A stripe unit group is used to describe a chunk group in FIG. 4. In this case, the chunk group 1 includes two stripes, and each stripe includes a data stripe unit group and a check stripe unit group. The chunk group 1 specifically includes a data stripe unit group including two data stripe units and a check stripe unit group including two check stripe units. The chunk group 2 includes two stripes, and each stripe includes a data stripe unit group and a check stripe unit group. The chunk group 2 specifically includes a data stripe unit group including four data stripe units and a check stripe unit group including two check stripe units.

This embodiment provides an implementation in which a stripe with a high redundancy ratio is changed to a stripe with a low redundancy ratio for storage. FIG. 4 is used as an example. To be specific, the chunk group 1 in the storage system is combined with another chunk group whose redundancy ratio is 1:1 (a chunk group in which mirroring is used for data protection), to generate a new chunk group (a chunk group whose width is the same as that of the chunk group 2). Therefore, the chunk groups of the system manage data in a form the same as that of the chunk group 2. Because the redundancy ratio of the chunk group 2 is low, storage space utilization is improved.

In this embodiment, a small-width source chunk group is used to generate a large-width target chunk group. A stripe of the target chunk group includes a check stripe unit part and a data stripe unit part, where the data stripe unit part points to a data stripe unit of a source stripe, and the check stripe unit part points to a check shard in a hard disk (or a storage device). In other words, the target chunk group actually has only a check shard, and does not actually have a data shard. The data shard of the source chunk group may be obtained from the target chunk group by using the directional relationship.

The following describes a process of generating a chunk group and a process of reading a data shard in the chunk group. For details, refer to a diagram of a chunk group relationship in FIG. 5, a diagram of a stripe relationship in FIG. 6, and a flowchart in FIG. 7.

Step S11: After a storage device is added to a storage system, a management device of the storage system determines a chunk group A and a chunk group B that are combined together. The chunk group A is an original chunk group in the storage device, and the chunk group B is an original chunk group in the storage system or a chunk group that is not written to a hard disk.

The storage system may further include a management device having a computing capability. In a centralized storage system, a management device is a controller (not shown in FIG. 1) or program code. The program code is run, so that the controller performs the steps in the method embodiments. In a distributed storage system, a management device and a storage device may be integrated together. For example, a same server is both a storage device and a management device. The management device may alternatively be separated from the storage device. For example, the management device is a dedicated management server, and the storage device is a dedicated storage server.

A chunk group includes one or more stripes, and each stripe includes a plurality of stripe units that form an EC check relationship. Each stripe unit corresponds to one shard, a data stripe unit corresponds to a data shard, and a check stripe unit corresponds to a check shard. A check relationship between stripe units is described in metadata of the chunk group.

In centralized storage, each chunk group may correspond to one piece of independent metadata. In a distributed scenario, a storage device is split into a plurality of partitions, each chunk group corresponds to one partition, and each partition has metadata. In the distributed scenario, when a plurality of chunk groups correspond to a same partition, the plurality of chunk groups correspond to a same piece of metadata.

Figure 5:
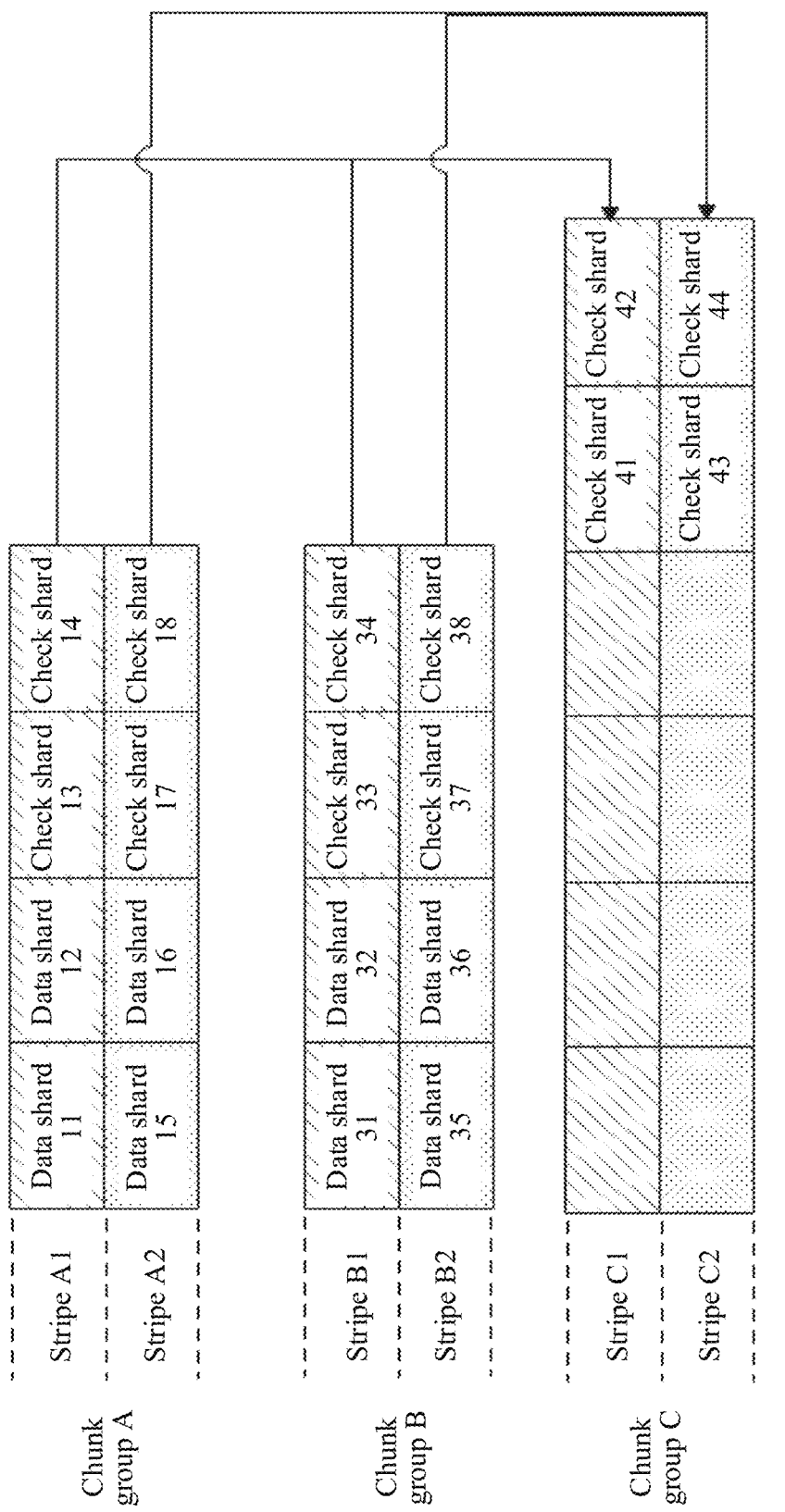
FIG. 5 is a diagram of a logical relationship of generating a chunk group.

A combination of all storage devices in a storage system is referred to as a storage device group. When a stripe is stored in the storage device group, different shards in the same stripe are stored in different storage devices, and different chunk groups have different chunk group IDs. A chunk group A and a chunk group B have stripes of a same quantity (when a quantity of stripes of the chunk group A is different from a quantity of stripes of the chunk group B, an all-zero stripe may be supplemented to a chunk group whose quantity of stripes is insufficient, so that the quantity of stripes of the chunk group A and the quantity of stripes of the chunk group B are the same after the supplementation). A data shard of the chunk group A and a data shard of the chunk group B may be located in different storage devices. Compared with a stripe in the chunk group B, a stripe in the chunk group A may have a same or different quantity of data shards. In FIG. 5, the same quantity is used as an example. Data shards of the chunk group A+data shards of the chunk group B=data shards of a chunk group C.

Figure 6:
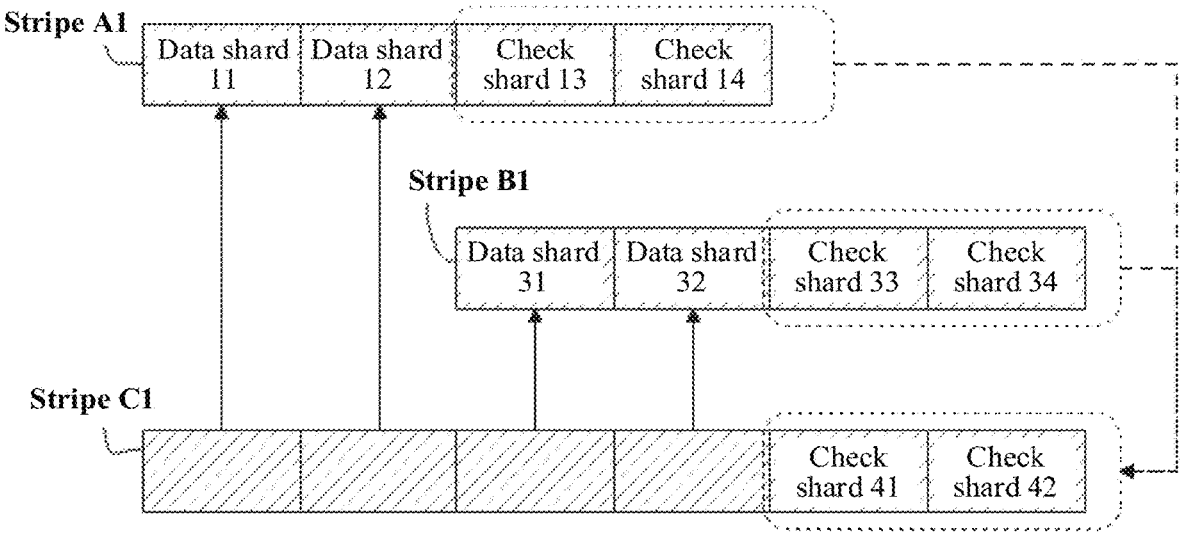
FIG. 6 is a diagram of a logical relationship of generating a chunk group.
Figure 7:
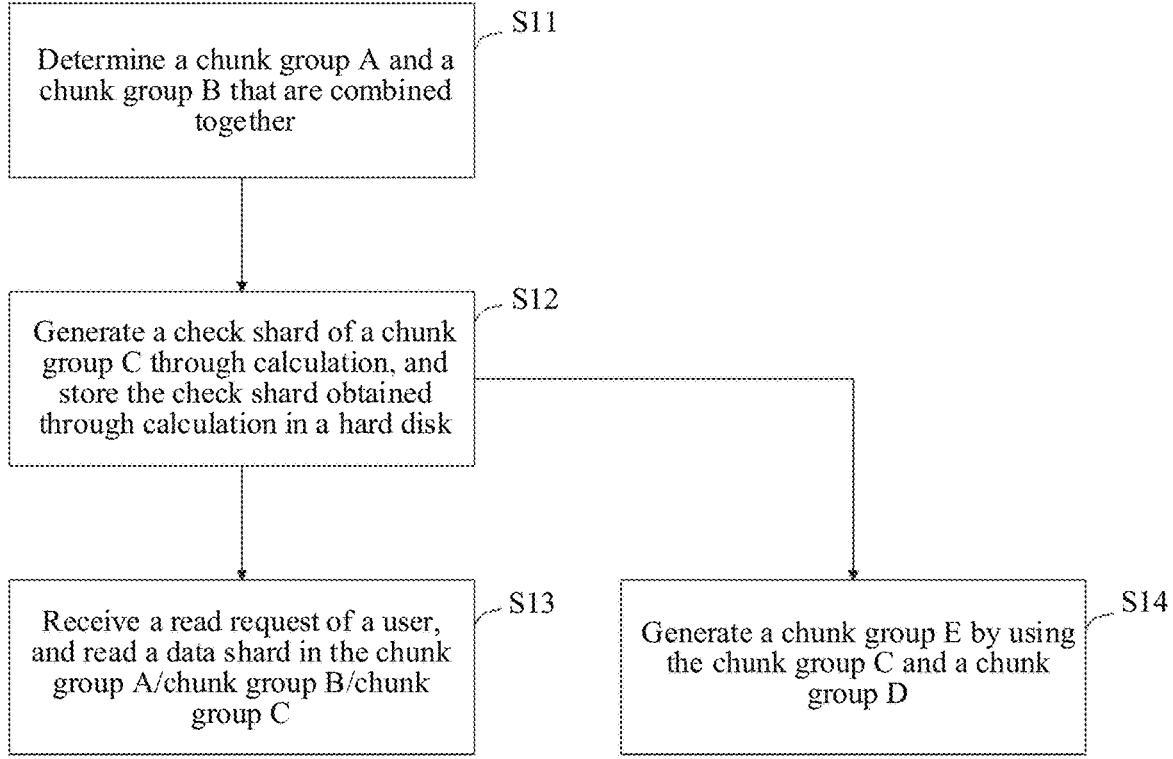
FIG. 7 is a flowchart of generating a chunk group.

A dashed line arrow in FIG. 6 describes a principle of generating a check shard of the chunk group C. To be specific, a check shard of a target chunk group (the chunk group C) may be generated by performing an operation by using a check shard of the chunk group B and a check shard of the chunk group A. A quantity of check shards in the chunk group A may be the same as or different from a quantity of check shards in the chunk group B, provided that a check shard of the chunk group C can be calculated.

In this embodiment, the chunk group B and the chunk group A may be selected based on the chunk group C, or the chunk group C may be determined based on the chunk group A and the chunk group B.

First, the chunk group A is determined, and then the chunk group B is jointly determined based on the chunk group A (for example, information such as the quantity of stripes of the chunk group A, an EC redundancy ratio (2+2), and a partition view) and the chunk group C that needs to be formed through splicing (for example, an EC redundancy ratio (2+2) of the chunk group C). A method for determining the chunk group B may be selecting a chunk group from existing chunk groups in the storage system. For example, when the chunk group C requires that data shards of a same stripe be not allowed to be located in a same storage device, when the chunk group B is selected, it may be required that a storage device in which a data shard of the chunk group B is located is not the same as a storage device in which a data shard of the chunk group A is located.

Alternatively, a chunk group B that meets a redundancy ratio requirement may be instantly generated based on a redundancy ratio of the chunk group C and a redundancy ratio of the chunk group A. In other words, a quantity of data chunks in the chunk group C−a quantity of data chunks in each stripe in the chunk group A=a quantity of data chunks in each stripe in the chunk group B.

A data source of the chunk group B may be the following several cases: (1) When this step is performed, the chunk group B is temporarily generated based on a newly received write IO and a requirement for the chunk group B. (2) The data source of the chunk group B may be a write IO received at any time, but data of the write IO is still temporarily stored in the management device and has not been persistently stored in a hard disk of the storage device group. (3) Garbage collection (GC) is performed on existing data of the storage device group, and the chunk group B is generated based on collected data. In this step, the data shard and the check shard (or only the check shard) in the chunk group B are not stored in the hard disk, but are stored in a memory of the management device.

For example, when capacity of the storage device group of the storage system is expanded from six storage devices to eight storage devices, to generate a 6+2 chunk group C, a 2+2 chunk group B is specially generated when a 4+2 chunk group A exists, so that the chunk group C can be exactly generated. In addition, when the data shard of the chunk group B is subsequently stored in the storage device, it may be required that the data shard of the chunk group B be stored in a storage device different from the storage device in which the data shard of the chunk group A is located, to improve reliability. To improve reliability, in addition to reducing or avoiding that the chunk group A and the chunk group B share a same storage device, a check shard of the chunk group C may be further stored in a newly added storage device, to avoid sharing a storage device with the chunk group A and the chunk group B. It should be noted that it is not necessary to distribute data shards of a same stripe to different storage devices. For example, when the storage device is a storage server, even if a plurality of data shards of a same stripe are located on different hard disks of the same storage server, reliability is still sufficient. This behavior is referred to as stripe folding.

A stripe of the chunk group C is obtained by using a stripe of the chunk group A and a stripe of the chunk group B together. This process may mean that the stripe of the chunk group C is obtained by combining the stripe of the chunk group A and the stripe of the chunk group B. Refer to FIG. 5. In this embodiment, the chunk group C is obtained by using the chunk group A and the chunk group B. Specifically, a first stripe (a stripe C1) of the chunk group C is obtained by using a first stripe (a stripe A1) of the chunk group A and a first stripe (a stripe B1) of the chunk group B, and a second stripe (a stripe C2) of the chunk group C is obtained by using a second stripe (a stripe A2) of the chunk group A and a second stripe (a stripe B2) of the chunk group B.

Step S12: The management device generates a check shard of the chunk group C through calculation, and stores the check shard obtained through calculation in the storage device group.

After step S12 is performed, there are three chunk groups in the storage system: the chunk group A, the chunk group B, and the chunk group C. The chunk group A and the chunk group B have data shards, and may not actually have a check shard. The chunk group C may actually have only the check shard, but does not actually have a data shard.

Because the chunk group C includes a plurality of stripes, only a generation process of the stripe C1 is described herein. A generation process of a chunk group 6 is the same as that of a chunk group 5. Therefore, details are not described again.

There are a plurality of calculation methods for check shards (a check shard 41 and a check shard 42) of the stripe C1. These methods specifically include: (1) The check shards (the check shard 41 and the check shard 42) of the stripe C1 are obtained through calculation by using check shards (a check shard 13 and a check shard 14) of the stripe A1 and check shards (a check shard 33 and a check shard 34) of the stripe B1. (2) The check shards (the check shard 41 and the check shard 42) of the stripe C1 are obtained through calculation by using check shards (a check shard 13 and a check shard 14) of the stripe A1 and data shards (a data shard 31 and a data shard 32) of the stripe B1. (3) The check shards (the check shard 41 and the check shard 42) of the stripe C1 are obtained through calculation by using data shards (a data shard 11 and a data shard 12) of the stripe A1 and check shards (a check shard 33 and a check shard 34) of the stripe B1. (4) The check shards (the check shard 41 and the check shard 42) of the stripe C1 are obtained through calculation by using data shards (a data shard 11 and a data shard 12) of the stripe A1 and data shards (a data shard 31 and a data shard 34) of the stripe B1.

When the stripe A1 is data that already exists in the storage device, and data of the stripe B1 comes from a write IO that has not been written to the hard disk or GC, the manner (2) or (4) may be used to directly generate the check shards of the stripe C1 by using the data shards of the stripe B1, without calculating the check shards of the stripe B1. This reduces a calculation amount of the management device.

The data shards in the existing stripe A1 and stripe B1 and the check shards in the newly generated stripe C1 jointly form a shard source of the stripe C1. For a user, the stripe C1, the stripe A1, and the stripe B1 each have complete data shards and check shards. However, actually, in a record of the management device, the stripe C1 has only the check shards but does not actually have the data shards (the stripe A1 and the stripe B1 have only the data shards but do not have the check shards). A relationship is established between the three stripes, so that the stripe C1 "indirectly" has the data shards, and the stripe A1 and the stripe B1 "indirectly" have the check shards. It should be noted that, in this embodiment, when a management device address of a stripe unit directly corresponds to an intra-disk logical address, it is considered that the stripe unit, a stripe in which the stripe unit is located, and a chunk group in which the stripe unit is located have a data shard stored in the intra-disk logical address. Such a direct correspondence is usually recorded in metadata of the chunk group.

A logical address of each shard may be described by the management device by using "chunk group ID+offset" (management device address). In a stripe on which persistent storage is performed, there is a correspondence between a management device address and an intra-disk logical address (a hard disk ID+LBA), and the correspondence is recorded by the management device by using metadata. Therefore, the check shards of the stripe A1 and the stripe B1 may be obtained from the hard disk by using the metadata, the check shards of the stripe A1 and the stripe B1 that are located in the hard disk are read into the memory of the management device, and then a processor of the management device generates the check shards of the stripe C1 through calculation.

For a chunk group having a plurality of stripes, an arrangement of stripe units of the chunk group complies with a matrix. A row in the matrix is a stripe, and a column in the matrix is formed by stripe units at same locations in different stripes. The following specifically describes concepts of the row and the column with reference to FIG. 2 and FIG. 5. The chunk group shown in FIG. 2 includes a total of 12 stripe units distributed in three rows and four columns. In FIG. 5, a stripe unit in a first column of the chunk group A has a data shard 11 and a data stripe 15, a stripe unit in a second row and a fifth column of the chunk group C has a check shard 43, and a second row and first to fourth columns of the chunk group C have no shard.

Step S12 further includes: generating metadata of the chunk group C. The metadata of the chunk group C records an ID of a chunk group associated with the chunk group C, namely, a chunk group ID of the chunk group A and a chunk group ID of the chunk group B. The chunk group C further records a correspondence between a column of the chunk group C and a column of the chunk group A, and a correspondence between a column of the chunk group C and a column of the chunk group B. In other words, the metadata of the chunk group C records a correspondence between a column of the chunk group C, a column of the chunk group A, and a column of the chunk group B. Optionally, such a correspondence may relate to only data columns, and but not check columns. FIG. 8 is a diagram of a correspondence between columns recorded in the metadata. In this embodiment, first and second columns of the chunk group C respectively correspond to first and second columns of the chunk group A, and third and fourth columns of the chunk group C respectively correspond to first and second columns of the chunk group B. In correspondences between these columns, only a correspondence between data columns may be recorded, and a correspondence between check columns is not recorded. In another implementation, columns are not in a one-to-one correspondence. Check columns of the chunk group C are determined through calculation by using check columns of the chunk group A and check columns of the chunk group B. This calculation method may be recorded in the metadata, or this correspondence may be found by using the metadata of the chunk group. This calculation method may be described by using the following formula:

$$f \text{ (third column of the chunk group } A, \text{ fourth column of the chunk group } A, \text{ third column of the chunk group } B, \text{ fourth column of the chunk group } B) = \text{fifth column of the chunk group } C, \text{ sixth column of the chunk group } C.$$

In an actual implementation, a column may be marked by using a chunk ID, different chunk IDs represent different columns, and a correspondence between chunk IDs is used to describe a correspondence between columns.

A correspondence between rows in chunk groups may be recorded by the metadata of the chunk group C, or may not be recorded separately, but by default, n rows of the chunk group C correspond to n rows of the chunk group A and n rows of the chunk group B. It should be noted that each row of a chunk group is an independent stripe, and therefore a row and a stripe are of a same concept.

A correspondence between any stripe unit in the chunk group C and a stripe unit in the chunk group A or a stripe unit in the chunk group B is described by the metadata of the chunk group C, or the correspondence may be found by using the metadata of the chunk group C. According to the descriptions in FIG. 6, a solid line arrow describes an example of a correspondence between a stripe unit in a first row in the chunk group C, a stripe unit in a first row in the chunk group A, and a stripe unit in a first row in the chunk group B. A correspondence between the chunk group C and other stripes in the chunk group A and the chunk group B is the same as this logic. Therefore, details are not described again.

It can be learned from FIG. 6 that the stripe C1 in the chunk group C corresponds to the stripe A1 in the chunk group A and the stripe B1 in the chunk group B. Specifically, a first column of stripe units of the stripe C1 corresponds to a first column of stripe units of the stripe A1, a second column of stripe units of the stripe C1 corresponds to a second column of stripe units of the stripe A1, a third column of stripe units of the stripe C1 corresponds to a first column of stripe units of the stripe B1, and a fourth column of stripe units of the stripe C1 corresponds to a second column of stripe units of the stripe B1.

The chunk group C does not actually have a data shard, but the correspondence may be used for subsequent reading of the data shard. For example, when a data shard in a second data stripe unit of the stripe C1 in the chunk group C is read, a stripe unit (namely, a second stripe unit of the stripe A1 in the chunk group A) that actually has the data shard may be found by using the correspondence. Then, a corresponding data shard (namely, the data shard 12) is read based on metadata of the chunk group A (the metadata records a correspondence between a management device address of the stripe unit and an intra-disk logical address).

In the metadata of the chunk group C, a correspondence between a management device address of each check stripe unit of the chunk group C and an intra-disk logical address is further recorded, and corresponding check shards (the check shard 41 and the check shard 42) may be directly read when required.

In step S12, the following step is further performed: updating metadata of the chunk group A and the chunk group B. After the solution provided in this embodiment is applied, check shards owned by the chunk group A and the chunk group B may be deleted (to meet an appearance of the stripe, original check stripe units in the chunk group A and the chunk group B may be reserved), to reduce storage space. Correspondingly, parts related to the check shards in the metadata of the chunk group A and the chunk group B need to be updated. Before the update, the correspondence between a management device address of each stripe unit and an intra-disk logical address is recorded in the metadata of the chunk group A and the chunk group B. After the update, a part that is of the metadata and that is related to the data stripe unit remains unchanged. For a part related to the check stripe unit, updated metadata indicates that the chunk group C provides check for the data stripe units of the chunk group A and the chunk group B. In other words, a stripe of the chunk group C provides check for a data stripe group in a corresponding stripe of the chunk group A and check for a data stripe group in a corresponding stripe of the chunk group B. Therefore, when the storage system receives a data read request from a host and needs to perform data check on the chunk group A/the chunk group B, it may be learned, by using the metadata of the chunk group A/the chunk group B, that a check capability of the two chunk groups is provided by the chunk group C.

Step S13: When receiving a read request from the host, the management device reads a corresponding data shard.

The following briefly describes an implementation of reading data. There are four possibilities in total based on a chunk group to which a read data unit belongs and whether a data shard is lost. The following separately describes the four possibilities one by one by using an example in which read data shards are located in the stripe A1 and the stripe C1. If a data shard to be read by the host is located in the stripe A2, the stripe B1, or the stripe B2, a principle is the same as this, and details are not described again. The host uses a host address (LUN ID+LBA+length) to access the storage system. The storage system converts the host address into a management device address (chunk group ID+offset).

(1) When a data shard of the stripe A1 is read, the read data shard is not lost.

Data is directly read from a corresponding hard disk based on an intra-disk logical address (disk ID+intra-disk LBA) corresponding to a management device address (chunk group ID+offset) recorded in the metadata of the chunk group A.

For example, data in the first column of stripe units is read from the stripe A1 of the chunk group A. Based on the metadata of the chunk group A, the storage system directly obtains an intra-disk logical address to which a management device address of the first column of stripe units of the stripe A1 are directly mapped, and may directly read the data shard 11 by using the intra-disk logical address and return the data shard to the host.

(2) When a data shard of the stripe A1 is read, the read data shard is lost.

For example, the read data shard is a data shard in the first column of stripe units of the stripe A1. Because the data shard 11 is lost, reading fails. Therefore, a degraded data read procedure is entered. In the metadata of the chunk group A, it is recorded that a redundancy protection capability of the chunk group A is provided by the chunk group C. Specifically, in term of stripes, the stripe C1 of the chunk group C provides a data protection capability for the stripe A1 of the chunk group A. Therefore, reading of the data shard 11 is changed to recovering a data shard corresponding to the first column of stripe units of the stripe C1. The storage system reads the shards in the second to sixth columns of the stripe C1 based on the metadata of the chunk group C, obtains the data shard 11 by using a check algorithm, and returns the data shard 11 to the host 100. Related content is similar to that of the case described in (4). Therefore, for the process, refer to the descriptions in (4).

Refer to the correspondence described by the solid line arrow in FIG. 6. The chunk group C does not directly record intra-disk logical addresses of the shards in the second to fourth columns of the stripe C1. Therefore, the three columns of data shards may be obtained by using the stripe A1 and the stripe B1. The shards (check shards) in the fifth and sixth columns of the stripe C1 are directly obtained from the chunk group 5.

(3) When a data shard of the stripe C1 is read, the read data shard is not lost.

The chunk group C does not directly have the data shard. However, based on the metadata of the chunk group C, it may be learned that a stripe unit of the chunk group C corresponds to a stripe unit having the data shard, so that the data shard can be read.

For example, the host requests to read the first column of stripe units of the stripe C1 in the chunk group C. The metadata of the chunk group C records that a first row of stripes of the chunk group C corresponds to a first row of stripes of the chunk group A, and a first column of stripe units of the chunk group C corresponds to a first column of stripe units of the chunk group A. Therefore, it may be uniquely determined that the first column of stripe units of the stripe C1 corresponds to the first column of stripe units of the stripe A1. The storage system may learn, by using the metadata of the chunk group A, an intra-disk logical address corresponding to a management device address of the first column of stripe units in the chunk group A. Then, the storage system may obtain the data shard 11 based on the intra-disk logical address.

(4) When a data shard of the stripe C1 is read, the read data shard is lost.

For example, the host requests to read the first column of stripe units of the stripe C1 in the chunk group C. Refer to the process described in (3). The storage system reads the data shard based on the first column of stripe units of the stripe A1 in the chunk group A, but the read fails because the data shard 11 is lost. Next, the storage system performs a data recovery operation.

First, according to a method similar to that for reading the first column of stripe units of the stripe C1 in the chunk group C, remaining data shards, namely, the data shard 12, the data shard 31, and the data shard 32, in the stripe C1 of the chunk group C are read. Then, the check shard 41 and the check shard 42 are read by using the intra-disk logical address recorded in the metadata of the chunk group C. The data shard 11 is recovered by using the data shard 12, the data shard 31, the data shard 32, the check shard 41, and check shard 42, and the data shard 11 is returned to the host. In addition, the data shard 11 obtained through data recovery may be further stored in the hard disk.

It can be learned from the descriptions of the four cases that a read request of the host for any data shard in the chunk group A, the chunk group B, and the chunk group C can be successfully executed provided that no data shard is lost or a lost data shard does not exceed a check capability of the EC algorithm.

Figure 9:
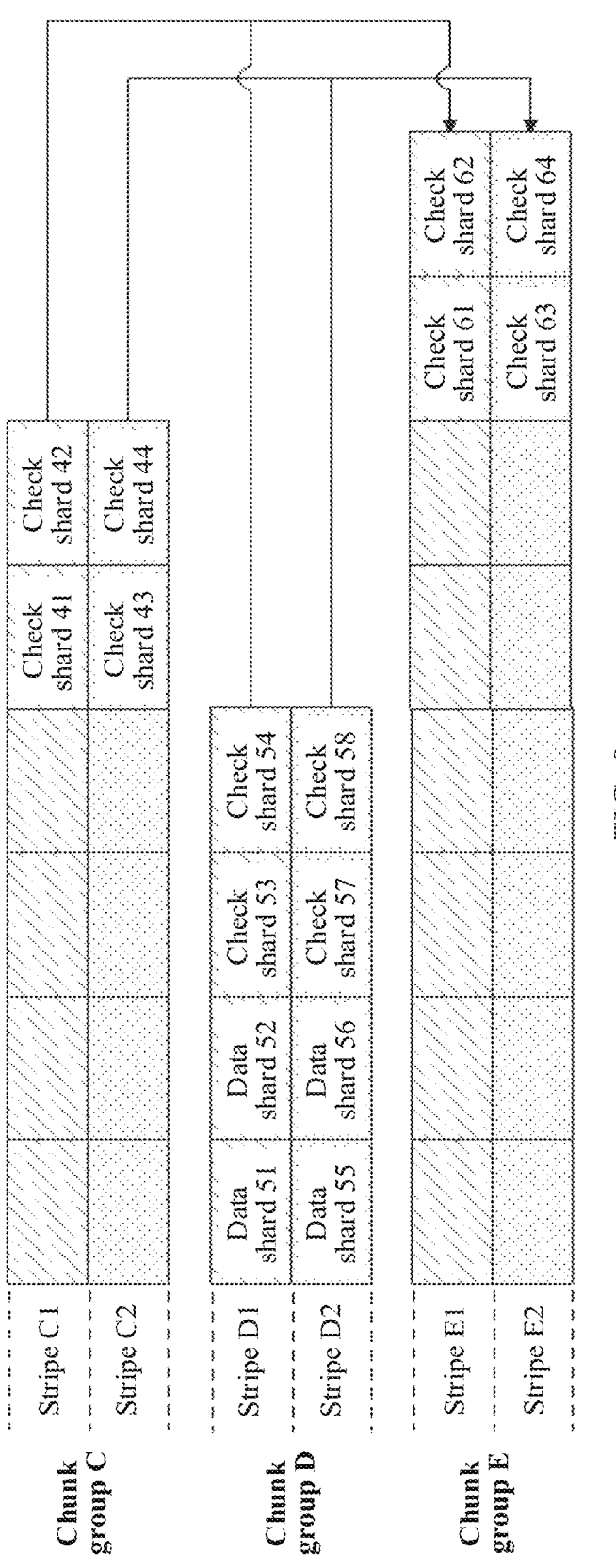
FIG. 9 is a diagram of a logical relationship of generating a chunk group again.

Step S14: Refer to FIG. 9. The chunk group C generated in step S12 may be combined with a chunk group D again to generate a new chunk group E. The chunk group D may be a chunk group generated by using the method provided in embodiments, may be a chunk group that is not generated by using the method provided in embodiments and that already exists in the storage device, or may be a newly generated chunk group that is not stored in the storage device. For a specific process of generating the chunk group E by using the chunk group C and the chunk group D and a process of reading data in the chunk group E, refer to steps S11 to S13. There are only a few adaptive changes. For example, when a data shard of a first stripe unit in a first row (a stripe E1) of the chunk group E is read, the chunk group C corresponding to the chunk group E needs to be first searched for based on metadata of the chunk group E. Then, the chunk group A corresponding to the chunk group C is searched for based on the metadata of the chunk group C, and then a corresponding data shard is obtained based on an intra-disk logical address recorded in the metadata of the chunk group A. It can be learned that, compared with that of the process described in steps S11 to S13, a principle is the same, and only a few adaptive adjustments exist. For example, a process of searching for a correspondence between management device addresses is added one more time. For a reason of saving space, details are not described herein. In another implementation, searching for the chunk group C may be avoided, and the chunk group E directly points to the chunk group A and the chunk group B. In this case, when the data shard of the first stripe unit in the first row (the stripe E1) of the chunk group E is read, the chunk group C does not need to be searched for, the chunk group A corresponding to the chunk group E is directly found, and the corresponding data shard is obtained based on the intra-disk logical address recorded in the metadata of the chunk group A. In this implementation, the check shards of the chunk group C may be deleted, to reduce search steps and reduce storage space.

Figure 10:
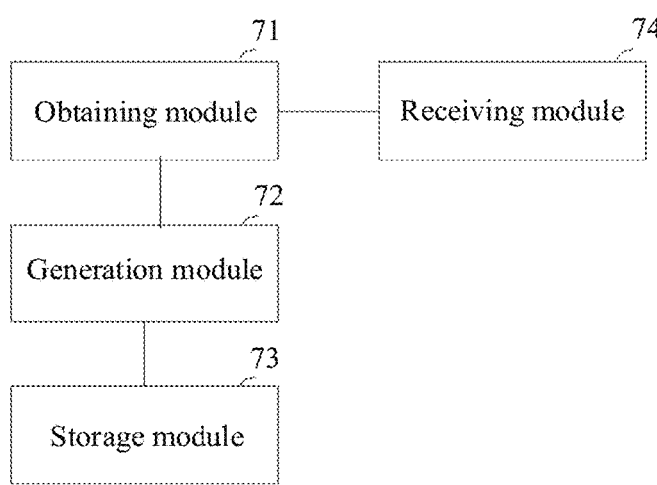
FIG. 10 is a diagram of a management apparatus for generating a chunk group.

Refer to FIG. 10. A management apparatus is for generating a chunk group. The management apparatus may be a hardware device (for example, a controller or a management device) or a program product run by at least one processor. The management apparatus includes an obtaining module 71, a generation module 72, and a storage module 73. When a data reading service is provided externally, the management apparatus further includes a receiving module 74. The management apparatus may perform the foregoing method. Because the method is described in detail in the method embodiments, only brief descriptions are provided herein.

The obtaining module 71 is configured to obtain a first source stripe from a first source chunk group, where the first source stripe includes a first data stripe group having a first data shard group and a first check stripe group having a first check shard group. The obtaining module 71 is further configured to obtain a second source stripe from a second source chunk group, where the second source stripe includes a second data stripe group having a second data shard group and a second check stripe group having a second check shard group.

The generation module 72 is configured to generate a target stripe, where the target stripe includes a target data stripe group and a target check stripe group, the target data stripe group points to the first data stripe group and the second data stripe group, the target check stripe group has a target check shard group, and there is a check relationship between the target check shard group and a set including the first data shard group and the second data shard group.

The storage module 73 is configured to store the target check shard group in a storage device group. The storage device group is, for example, a combination of hard disks or a combination of storage servers.

The target data stripe group does not have a data shard.

When both the first source chunk group and the second source chunk group are located in a storage device before capacity expansion of a storage system, the storage module 73 is further configured to store a check shard of the target stripe in a storage device that is newly added after the capacity expansion of the storage device group.

When the first source chunk group is located in a storage device before capacity expansion of a storage system, and the second source chunk group is a chunk group that is not stored in the storage device, the storage module 73 is further configured to store a check shard of the target stripe in a storage device that is newly added after the capacity expansion of the storage system. In this case, the second data stripe group is generated based on newly-written data, or the second data stripe group is generated based on data obtained through garbage collection; and the data shard of the second source chunk group is stored in the storage device.

Optionally, a redundancy ratio of the first source stripe is the same as that of the second source stripe.

Optionally, the target stripe belongs to a target chunk group, and the first source chunk group, the second source chunk group, and the target chunk group have stripes of a same quantity.

The storage module 73 is further configured to: enable, based on a correspondence between the target stripe and each of the first source stripe and the second source stripe, that a data shard of the first source stripe and a data shard of the second source stripe do not need to be written into the target stripe.

The management apparatus further includes the receiving module 74. The receiving module 74 is configured to receive a read request for a target stripe unit in the target stripe. Correspondingly, the obtaining module 71 is further configured to determine, based on a data stripe group to which the target data stripe unit points, a stripe unit corresponding to the target stripe unit. Correspondingly, the obtaining module 71 is further configured to obtain a data shard of the determined stripe unit.

The obtaining module 71 is configured to: when a data shard in the first data shard group or the second data shard group is lost, read the target check shard group, read a non-lost data shard in the first source stripe and the second source stripe, and reconstruct the lost data shard.

A chunk group in which the target stripe is located is a third chunk group. The obtaining module 71 is further configured to obtain the first source stripe from the third source chunk group, where the first source stripe includes a first data stripe group having a first data shard group and a first check stripe group having a first check shard group. The obtaining module 71 is further configured to obtain a fourth source stripe from a fourth source chunk group, where the fourth source stripe includes a fourth data stripe group having a fourth data shard group and a fourth check stripe group having a fourth check shard group. The obtaining module 71 is further configured to generate a fourth stripe, where the fourth stripe includes a fourth data stripe group and a fourth check stripe group, the fourth data stripe group points to the target data stripe group and the second data stripe group, the fourth check stripe group has a fourth check shard group, and there is a check relationship between the fourth check shard group and a set including the target data shard group and the second data shard group. The storage module 73 is further configured to store the fourth check shard group in the storage device.

There is another description manner for functions of the modules in the management apparatus. The obtaining module 71 is configured to obtain N source stripes from N source chunk groups, where different source stripes come from different source chunk groups, each source stripe includes a data stripe group having a data shard group and a check stripe group having a check shard group, and N is equal to 2 or N is greater than 2. The generation module 72 is configured to generate a target stripe, where the target stripe includes a target data stripe group and a target check stripe group, the target data stripe group points to the N source stripe groups, the target check stripe group has a target check shard group, and there is a check relationship between the target check shard group and a set of N data shard groups. The storage module 73 is configured to store the target check shard group in a storage device. The storage device described in FIG. 10 also has a function of a management device. The storage device includes a storage medium (not shown in the figure), a processor (not shown in the figure), and a hard disk group that persistently stores a check shard of a chunk group A, a check shard of a chunk group B, and a check shard of a chunk group C.

Figure 11:
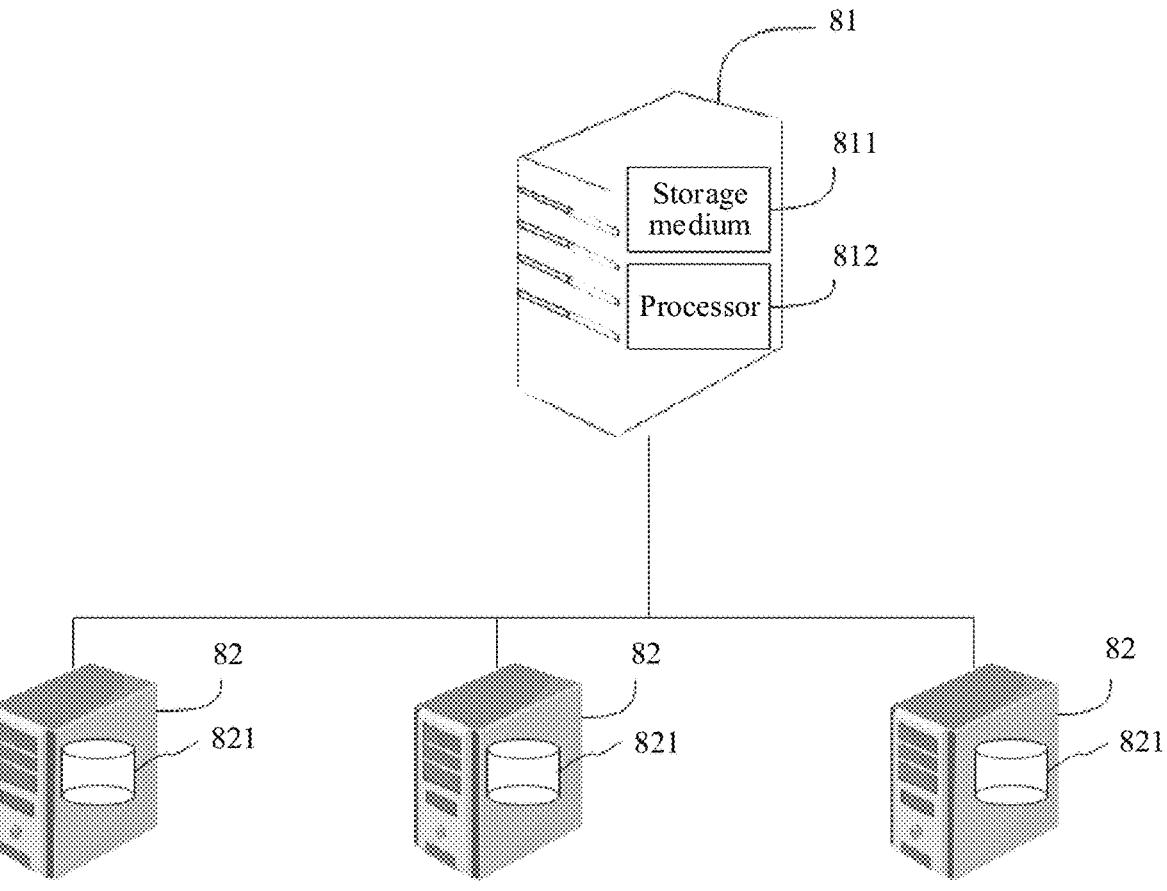
FIG. 11 is a diagram of an architecture of a storage system.

FIG. 11 is a diagram of an architecture of a storage system including a management device. A management device 81 includes a storage medium 811 and a processor 812. The storage medium 811 (for example, a read-only memory (ROM) or a solid-state disk (SSD)) is configured to store program instructions. At least one processor 812 is coupled to the storage medium 811. The at least one processor 812 is configured to perform the method steps by running the computer program. In some cases, the management device 81 may be a storage device 82. In other words, a same device plays both a role of the management device and a role of the storage device.

A computer program product includes instructions. When the computer program product runs on a computer, the computer is enabled to perform the solution in the first aspect and the solutions in the possible implementations of the first aspect.

A computer-readable storage medium includes instructions. When the instructions are run on a computer, the computer is enabled to perform the solution in the first aspect and the solutions in the possible implementations of the first aspect.

One or more of the module or units may be implemented by software, hardware, or a combination thereof. When any one of the module or units is implemented by software, the software exists in a manner of computer program instructions, and is stored in a storage device. A processor may be configured to execute the program instructions and implement the method procedure. The processor may include but is not limited to, at least one of the following types: a central processing unit (CPU), a microprocessor, a digital signal processor (DSP), a microcontroller unit (MCU), and a computing device used for running software like an artificial intelligence processor. Each computing device may include one or more cores used to execute software instructions to perform operations or processing. The processor may be built in a system on a chip (SoC) or an application-specific integrated circuit (ASIC), or may be an independent semiconductor chip. In addition to the cores used to execute the software instruction to perform calculation or processing, the processor may further include a necessary hardware accelerator, such as a field-programmable gate array (FPGA), a programmable logic device (PLD), or a logic circuit implementing dedicated logical operation.

When the foregoing modules or units are implemented by hardware, the hardware may be any one of or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device. The hardware may run necessary software or without software to execute the foregoing method procedure.

What is claimed is:

1. A method comprising:
   obtaining a first source stripe from a first source chunk group, wherein the first source stripe comprises a first data stripe unit group, wherein the first data stripe unit group comprises a first data shard group and a first check stripe unit group, and wherein the first check stripe unit group comprises a first check shard group;
   obtaining a second source stripe from a second source chunk group, wherein the second source stripe comprises a second data stripe unit group, wherein the second data stripe unit group comprises a second data shard group and a second check stripe unit group, and wherein the second check stripe unit group comprises a second check shard group;
   generating a target stripe comprising a target data stripe unit group and a target check stripe unit group, wherein the target data stripe unit group points to the first data stripe unit group and the second data stripe unit group, wherein the target check stripe unit group comprises a target check shard group, and wherein the target check shard group has a first check relationship with a shard set comprising the first data shard group and the second data shard group; and
   storing the target check shard group in a storage device group.

2. The method of claim 1, wherein the target data stripe unit group does not comprise a data shard.

3. The method of claim 1, further comprising storing the first source chunk group and the second source chunk group in the storage device group before performing a capacity expansion of a storage system.

4. The method of claim 3, wherein when not storing the second source chunk group in the storage device group, the method further comprises:

generating the second data stripe unit group based on newly-written data; and storing a data shard of the second source chunk group in the storage device group.

5. The method of claim 1, further comprising:

performing a capacity expansion of a storage system;

adding the storage device group after the capacity expansion; and storing the target check shard group by storing a check shard of the target stripe in the storage device group after adding the storage device group.

6. The method of claim 1, wherein the first source stripe and the second source stripe have a same redundancy ratio.

7. The method of claim 1, wherein the target stripe belongs to a target chunk group, and wherein the first source chunk group, the second source chunk group, and the target chunk group comprise a same quantity of stripes.

8. The method of claim 1, further comprising:

receiving a read request for a target data stripe unit in the target stripe;

determining, based on a pointer of the target data stripe unit, a to-be-determined stripe unit corresponding to the target data stripe unit, wherein the to-be-determined stripe unit belongs to the first data stripe unit group or the second data stripe unit group; and obtaining a data shard of the to-be-determined stripe unit.

9. The method of claim 1, wherein when a data shard in the first data shard group or the second data shard group is lost, the method further comprises:

reading the target check shard group;

reading a first non-lost data shard in the first source stripe and a second non-lost data shard in the second source stripe; and reconstructing the data shard that is lost based on the first non-lost data shard and the second non-lost data shard.

10. The method of claim 1, wherein the target stripe belongs to a target chunk group, and wherein the method further comprises:

obtaining a third source stripe from a third source chunk group, wherein the third source stripe comprises a third data stripe unit group, wherein the third data stripe unit group comprises a third data shard group and a third check stripe unit group, and wherein the third check stripe unit group comprises a third check shard group;

generating a new target stripe based on the target stripe and the third source stripe, wherein the new target stripe comprises a new target data stripe unit group and a new target check stripe unit group, and wherein the new target data stripe unit group points to the first data stripe unit group, the second data stripe unit group, and the third data stripe unit group or the new target data stripe unit group points to the target data stripe unit group and the third data stripe unit group, wherein the new target check stripe unit group comprises a new target check shard group, and wherein the new target check shard group has a second check relationship with a data set comprising a data shard group to which the new target data stripe unit group points; and storing the new target check shard group in the storage device group.

11. A storage management device comprising:

a storage medium configured to store program instructions; and at least one processor coupled to the storage medium and configured to execute the program instructions to cause the storage management device to:

obtain a first source stripe from a first source chunk group, wherein the first source stripe comprises a first data stripe unit group, wherein the first data stripe unit group comprises a first data shard group and a first check stripe unit group, and wherein the first check stripe unit group comprises a first check shard group;

obtain a second source stripe from a second source chunk group, wherein the second source stripe comprises a second data stripe unit group, wherein the second data stripe unit group comprises a second data shard group and a second check stripe unit group, and wherein the second check stripe unit group comprises a second check shard group;

generate a target stripe comprising a target data stripe unit group and a target check stripe unit group, wherein the target data stripe unit group points to the first data stripe unit group and the second data stripe unit group, wherein the target check stripe unit group comprises a target check shard group, and wherein the target check shard group has a first check relationship with a shard set comprising the first data shard group and the second data shard group; and store the target check shard group in a storage device group.

12. The storage management device of claim 11, wherein the target data stripe unit group does not comprise a data shard.

13. The storage management device of claim 11, wherein the at least one processor is further configured to execute the program instructions to cause the storage management device to store the first source chunk group, but not the second source chunk group, in the storage device group before performing a capacity expansion of a storage system.

14. The storage management device of claim 13, wherein when not storing the second source chunk group in the storage device group, the at least one processor is further configured to execute the program instructions to cause the storage management device to:

generate the second data stripe unit group based on newly-written data; and store a data shard of the second source chunk group in the storage device group.

15. The storage management device of claim 11, wherein the at least one processor is further configured to execute the program instructions to cause the storage management device to:

perform a capacity expansion of a storage system;

add the storage device group after the capacity expansion; and store the target check shard group by storing a check shard of the target stripe in the storage device group after adding the storage device group.

16. The storage management device of claim 11, wherein the first source stripe and the second source stripe have a same redundancy ratio.

17. The storage management device of claim 11, wherein the target stripe belongs to a target chunk group, and wherein the first source chunk group, the second source chunk group, and the target chunk group comprise a same quantity of stripes.

18. The storage management device of claim 11, wherein the at least one processor is further configured to execute the program instructions to cause the storage management device to:

receive a read request for a target data stripe unit in the target stripe;

determine, based on a pointer of the target data stripe unit, a to-be-determined stripe unit corresponding to the target data stripe unit, wherein the to-be-determined stripe unit belongs to the first data stripe unit group or the second data stripe unit group; and obtain a data shard of the to-be-determined stripe unit.

19. The storage management device of claim 11, wherein when a data shard in the first data shard group or the second data shard group is lost, the at least one processor is further configured to execute the program instructions to cause the storage management device to:

read the target check shard group;

read a first non-lost data shard in the first source stripe and a second non-lost data shard in the second source stripe; and reconstruct the data shard that is lost based on the first non-lost data shard and the second non-lost data shard.

20. The storage management device of claim 11, wherein the target stripe belongs to a target chunk group, and wherein the at least one processor is further configured to execute the program instructions to cause the storage management device to:

obtain a third source stripe from a third source chunk group, wherein the third source stripe comprises a third data stripe unit group, wherein the third data stripe unit group comprises a third data shard group and a third check stripe unit group, and wherein the third check stripe unit group comprises a third check shard group;

generate a new target stripe based on the target stripe and the third source stripe, wherein the new target stripe comprises a new target data stripe unit group and a new target check stripe unit group, and wherein the new target data stripe unit group points to the first data stripe unit group, the second data stripe unit group, and the third data stripe unit group or the new target data stripe unit group points to the target data stripe unit group and the third data stripe unit group, wherein the new target check stripe unit group comprises a new target check shard group, and wherein the new target check shard group has a second relationship with a data set comprising a data shard group to which the new target data stripe unit group points; and store the new target check shard group in the storage device group.

\* \* \* \* \*